C. B. Hutchinson,
Reciprocating Saw-Mill.
Nº 12,679.                    Patented Apr. 10, 1855.

UNITED STATES PATENT OFFICE.

CHARLES B. HUTCHINSON, OF AUBURN, NEW YORK.

MODE OF GUIDING RECIPROCATING SAWS.

Specification of Letters Patent No. 12,679, dated April 10, 1855.

*To all whom it may concern:*

Be it known that I, CHARLES B. HUTCHINSON, of Auburn, in the county of Cayuga and State of New York, have invented a new and Improved Mode of Hanging Saws in Sawmills; and I do hereby declare that the following is a full and exact description thereof, reference being had to the accompanying drawings and to the letters of reference marked thereon.

Figure 1:
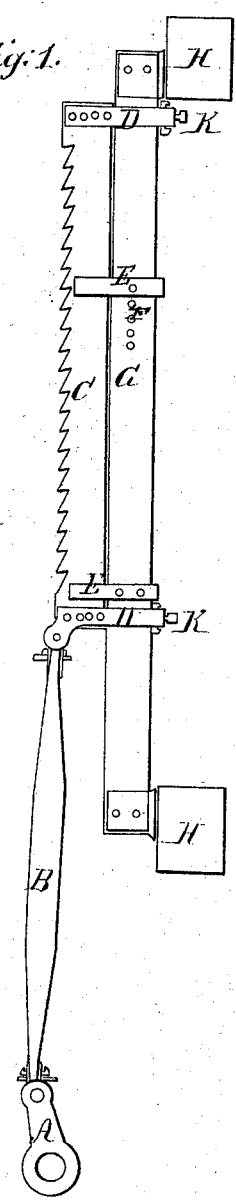
Figure 2:
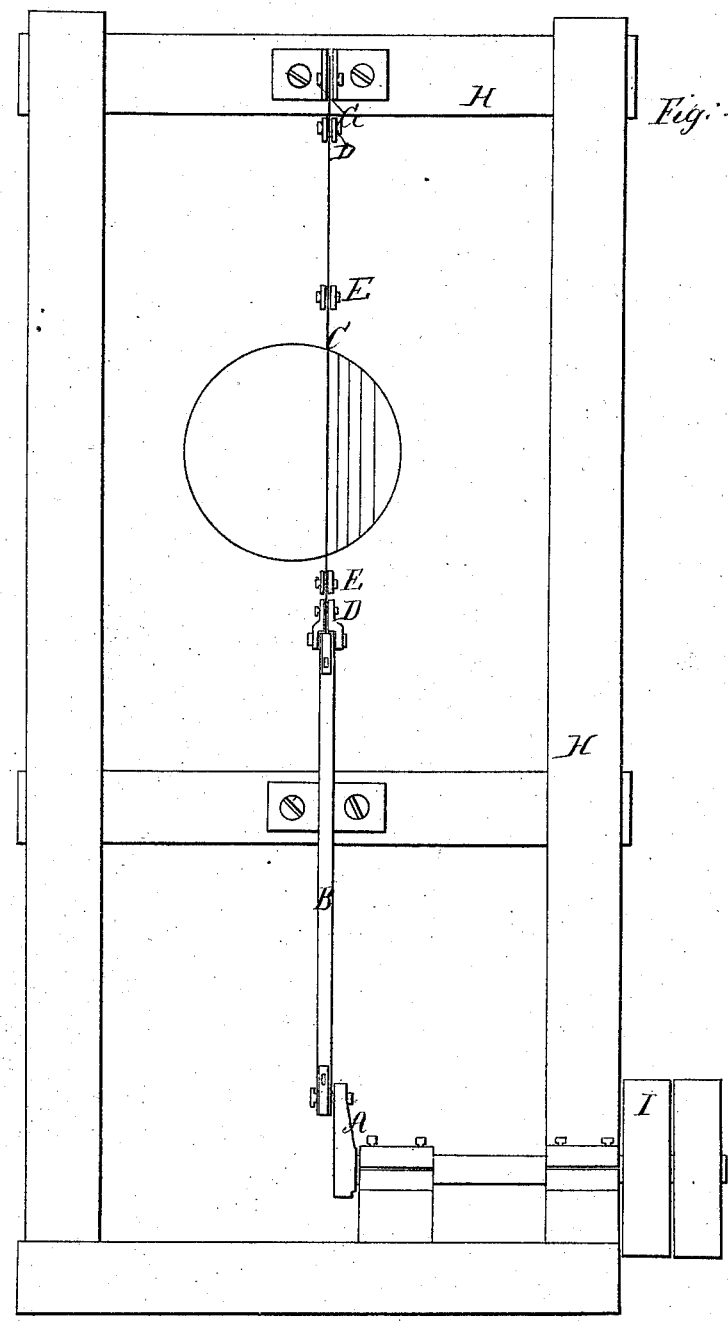

Figure 1, is a side view of a saw, hung in the manner proposed, and Fig. 2, a front view of the same; the same letters referring to like parts on each.

G, is a steel plate like a saw plate, firmly secured at each end to the cross timbers of a stationary frame H, or in any other suitsuitable manner, so as to admit of being strained. It should be thicker than the saw by about the amount of set required to be given to the saw teeth.

E are straps or side guides projecting from G, through which the same is to pass.

C is the saw; shown in the figures as attached at its lower end by a pitman B to the crank A and drawn by a pulley I. From the ends of the saw proceed the straps D, which pass round and inclose the stationary guide plate G, allowing to the saw a free motion or vibration in the direction of its length, at the same time that they hold it snugly to its place in front of the guide plate.

K is a gib or friction piece, interposed between the back of the guide plate and the loop of the strap D, which as it wears loose may be tightened at pleasure by means of a set screw, as shown in the figure.

The side guides E project nearly to the sawteeth and are placed one a little above and the other a little below the log, the former being adjustable to the proper height by using one or the other of the bolt holes F as the case may require. The plate G, is readily adjustable to a plumb line, and also may be easily set so as to give any desired rake to the saw. The dotted line in Fig. 2 indicates the position of the head block on which the log rests. What I consider novel in this arrangement is the mode of holding and guiding the saw by means of a thin guide plate immediately behind and in the same plane with it, and thus following it through the log, dispensing with fender posts and ways and heavy vibrating frames, and also, as the plate is made thicker than the saw, keeping it clear of the logs and boards, and protecting it from pinching, and diminishing the liability to run which results from the crowding of the stuff against it. I say dispensing with fender posts, because, although shown in the drawing, they are by no means necessary, as there is nothing to move in them, and the guide plate can be easily fixed and strained to sill and beam of the building, or in other ways. The advantages thus secured, in respect to simplicity and cheapness of construction, and comparative freedom from rack and jar, are obvious, and need no particular explanation.

What therefore I claim as new, and desire to secure by Letters Patent in the mode of hanging saws for saw mills as above described, is—

The use of a thin guide plate, for holding and guiding the saw, placed immediately behind and in the same plane with it, and following it through the log, whether the same be used by itself, or in connection with any other means of holding and guiding the saw.

C. B. HUTCHINSON.

In presence of—
  JOHN L. SMITH,
  JOS. G. E. LARNED.